United States Patent [19]
Fujikawa et al.

[11] Patent Number: 5,995,177
[45] Date of Patent: Nov. 30, 1999

[54] ACTIVE MATRIX SUBSTRATE WITH MULTI-LAYER SIGNAL LINES AND/OR ELECTRODES

[75] Inventors: Takashi Fujikawa, Tenri; Yoshinori Shimada, Taki-gun; Yoshiharu Kataoka, Suita; Yoshikazu Sakuhana, Yamatokoriyama; Mikio Katayama, Ikoma, all of Japan

[73] Assignee: Sharp Kabushiki Kaisha, Osaka, Japan

[21] Appl. No.: 09/095,586

[22] Filed: Jun. 11, 1998

[30]  Foreign Application Priority Data

Jun. 13, 1997 [JP]  Japan ..................................... 9-157051

[51] Int. Cl.$^6$ ........................... G02F 1/136; G02F 1/1343
[52] U.S. Cl. ............................................... 349/46; 349/147
[58] Field of Search ........................ 349/46, 147

[56]  References Cited

U.S. PATENT DOCUMENTS

| | | | |
|---|---|---|---|
| 5,555,112 | 9/1996 | Oritsuki et al. ............................ | 359/59 |
| 5,585,951 | 12/1996 | Noda et al. . | |
| 5,641,974 | 6/1997 | den Boer et al. . | |
| 5,708,484 | 1/1998 | Someya et al. ............................ | 349/38 |

*Primary Examiner*—William L. Sikes
*Assistant Examiner*—Heidi L. Eisenhut
*Attorney, Agent, or Firm*—Nixon & Vanderhye P.C.

[57]  ABSTRACT

An active matrix substrate includes an insulative plate; a plurality of switching elements arranged in a matrix on the insulative plate; a plurality of gate signal lines for controlling the switching elements; a plurality of source signal lines for providing data signals to the switching elements, the source signal lines being perpendicular to the gate signal lines; and a plurality of pixel electrodes respectively provided above and in electric connection with drain electrodes of the switching elements. At least one of the source signal lines and the drain electrodes include at least a transparent conductive layer, a first metal layer and a second metal layer.

23 Claims, 12 Drawing Sheets

ACTIVE MATRIX SUBSTRATE WITH MULTI-LAYER SIGNAL LINES AND/OR ELECTRODES

BACKGROUND OF THE INVENTION

1. Field of the Invention

The present invention relates to an active matrix substrate usable in, for example, a liquid crystal display device.

2. Description of the Related Art

FIG. 9 is a partial equivalent circuit diagram of a conventional active matrix substrate 500.

The active matrix substrate 500 shown in FIG. 9 includes a transparent insulative plate 101 formed of glass or the like, a plurality of gate signal lines 102 formed of tantalum or the like, a plurality of storage capacitance common lines 103 for forming a storage capacitance Cs, and a plurality of source signal lines 104. The gate signal lines 102, the storage capacitance common lines 103 and the source signal lines 104 are provided on the transparent insulative plate 101. The source signal lines 104 are arranged perpendicular to the gate signal lines 102 and the storage capacitance common lines 103. The source signal lines 104 have a two-layer structure including a metal layer and an ITO (indium tin oxide) layer. The active matrix substrate 500 further includes a plurality of pixel electrodes 105 arranged in a matrix and a plurality of thin film transistors (hereinafter, referred to as a "TFT") 106 acting as switching elements. The pixel electrodes 105 are connected to the gate signal lines 102 and the source signal lines 104 through the TFTs 106. In the case where the active matrix substrate 500 is included in a transmissive device, the pixel electrodes 105 are formed of a transparent conductive material such as, for example, ITO. In the case where the active matrix substrate 500 is included in a reflective device, the pixel electrodes 105 are formed of aluminum or the like.

The active matrix substrate 500 further includes, in a peripheral area thereof, gate signal line terminals 107 for inputting synchronization signals, storage capacitance common line terminals 108, and source signal line terminals 109 for inputting video signals. Although not shown in FIG. 9, the terminals 107, 108 and 109 include a transparent conductive layer for covering an underlying metal layer for the purpose of preventing the underlying metal layer from being oxidized. The transparent conductive layer is formed of, for example, ITO, which is used for forming the pixel electrodes 105 and the source signal lines 104.

FIG. 10 is a plan view of one pixel area of the active matrix substrate 500 shown in FIG. 9, from which an interlayer insulative layer and the pixel electrode 105 are omitted for clarity. FIG. 11 is a plan view of one pixel area of the active matrix substrate 500 shown in FIG. 9. FIG. 12 is a cross-sectional view of the one pixel area shown in FIG. 11 taken along line XII—XII in FIG. 11. FIG. 13 is a cross-sectional view of a part of the one pixel area shown in FIG. 11 taken along line XIII—XIII in FIG. 11. As shown in FIG. 11, a peripheral area of the pixel electrode 105 overlaps the gate signal lines 102 and the source signal lines 104. In FIG. 13, an interlayer insulative layer and the pixel electrode 105 are omitted for clarity. The following description will be provided regarding one pixel area for simplicity.

Referring to FIGS. 12 and 13, the gate signal line 102 including a gate electrode 116 and a storage capacitance common line 103 are provided on the transparent insulative plate 101. A gate insulating layer 112 is provided on the transparent insulative plate 101 so as to cover the gate signal line 102 including the gate electrode 116 and the storage capacitance common line 103.

As shown in FIG. 13, a semiconductor layer 113 is provided on the gate insulating layer 112 so as to overlap the gate electrode 116. An $n^+$ silicon layer 114 and an $n^+$ silicon layer 115 are provided on the semiconductor layer 113 with a gap interposed therebetween. A source electrode 117 and a drain electrode 110, each formed of an ITO layer 126 and a metal layer 125, are provided on the $n^+$ silicon layers 115 and 114, respectively. The TFT 106 includes the gate electrode 116, the semiconductor layer 113, the $n^+$ silicon layers 114 and 115, the source electrode 117 and the drain electrode 110. The gap between the $n^+$ silicon layers 114 and 115 corresponds to a channel region of the TFT 106.

As best shown in FIG. 11, the ITO layer which is a part of the drain electrode 110 is extended in a direction perpendicular to the gate signal line 102 and the storage capacitance common line 103 and then further extended in a direction overlapping the storage capacitance common line 103. The extended part of the ITO layer acts as a connecting electrode 127. The part of the connecting electrode 127 which overlaps the storage capacitance common line 103 acts as a storage capacitor electrode 127a.

As shown in FIG. 12, the interlayer insulative layer 118 is provided on the gate insulative layer 112 so as to cover the elements provided on the gate insulative layer 112. The pixel electrode 105 is provided on the interlayer insulative layer 118. The interlayer insulative layer 118 has a contact hole 111 provided therethrough. The connecting electrode 127 is electrically connected to the pixel electrode 105 through the contact hole 111. The drain electrode 110 (FIG. 13) is electrically connected to the pixel electrode 105 through the connecting electrode 127. A portion where the storage capacitor electrode 127a, the gate insulative layer 112 and the storage capacitance common line 103 overlap one another acts as a storage capacitor.

In the above-described structure, the pixel electrode 105 overlaps the source signal line 104 due to the interlayer insulative layer 118 provided therebetween. Accordingly, the aperture ratio is raised, and the leak between the source signal line 104 and the pixel electrode 105 is reduced.

A method for producing the conventional active matrix substrate 500 will be described with reference to FIGS. 14A through 14E and 15A through 15E.

FIGS. 14A through 14E are cross-sectional views illustrating a process for producing the TFT 106. FIGS. 15A through 15E are cross-sectional views illustrating a process for producing the gate signal line terminal 107 and the storage capacitance common line terminal 108. Since the terminals 107 and 108 have a substantially identical structure, the gate signal line terminal 107 will be described as an example.

First, as shown in FIGS. 14A and 15A, a metal layer is formed on the transparent insulative plate 101 and patterned into the gate signal lines 102 including the gate electrode 116.

As shown in FIGS. 14B and 15B, the gate insulative layer 112 is formed on the transparent insulative plate 101 so as to cover the gate electrode 116 and the gate signal line 102. Then, as shown in FIG. 14B, the semiconductor layer 113 and an $n^+$ silicon layer 124 are formed sequentially on the gate insulative layer 112.

As shown in FIG. 15C, a contact hole 112a for forming a connecting portion (represented by reference numeral 130 in FIG. 15D) of the gate signal line terminal 7 is formed in the gate insulative layer 112.

As shown in FIG. 14C, the ITO layer 126 and the metal layer 125 are formed on the n+ silicon layer 124. The ITO metal layer 125 and the ITO layer 126 are separately patterned by photolithography or the like in this order. As a result, the source electrode 117 and the drain electrode 110 are formed as shown in FIG. 14D, and the connecting portion 130 is formed of the ITO layer 126 which is formed as shown in FIG. 15D as a result of the removal of the metal layer 125. As best shown in FIG. 13, the ITO layer 126 is patterned to extend on the gate insulative layer 112 from the drain electrode 110 in a direction perpendicular to the gate signal line 102 (FIG. 11) and then in a direction overlapping the storage capacitance common line 103 so as to act as the connecting electrode 127.

For the TFT 106, the ITO layer 126 is provided for preventing line disconnections and for protecting the underlying layers against etching which is performed on the metal layer 125. The connecting electrode 127 is formed only of the ITO layer 126 in order to raise the aperture ratio and also obtain ohmic contact with the pixel electrode 105.

Then, as shown in FIG. 14E, an area of the n+ silicon layer 124 corresponding to a channel region in the semiconductor layer 113 is removed, thereby forming the n+ silicon layers 114 and 115. The interlayer insulative layer 118 is formed on the gate insulative layer 112 so as to cover the elements which are formed on the gate insulative layer 112 except for the area where the terminals 107, 108 and 109 are formed. A transparent conductive layer, for example, an ITO layer is formed on the interlayer insulative layer 118 (FIG. 14E) and on the gate insulative layer 112 so as to cover the connecting portion 130 (FIG. 15E). The ITO layer on the interlayer insulative layer 118 is patterned to form the pixel electrode 105 (FIG. 14E) and also a transparent conductive layer 105a (FIG. 15E).

An alignment layer is formed when necessary. Thus, the active matrix substrate 500 is completed. A liquid crystal display device, for example, is produced by combining the active matrix substrate 500 with a counter substrate (not shown) and injecting a liquid crystal material into the gap between the two substrates and sealing the gap.

According to the active matrix substrate 500 having the above-described structure, the drain electrode 110 which is connected to the pixel electrode 105, the connecting electrode 127 extended from the drain electrode 110, and the connecting portion 130 of the terminals 107 and 108 are formed in the same step as the source signal line 104 including the source electrode 117. However, the connecting electrode 127 and the connecting portion 130 are formed of only the ITO layer 126. Accordingly, the metal layer 125 and the ITO layer 126 need to be separately patterned by photolithography or the like. Thus, the number of production steps is increased, and defective photo-patterning may disadvantageously occur. Consequently, there is an undesirable possibility of source-drain leak. As a result, the production yield is reduced.

In order to reduce the number of steps of performing photolithography so as to raise the production yield even though the aperture ratio is slightly lowered, it is conceivable that the connecting electrode 127, the source signal line 104, and the connecting portion 130 of each of the terminals 107 and 108 are formed of the metal layer 125 and the ITO layer 126.

In such a structure, however, a contact deficiency occurs between the pixel electrode 105 and the connecting electrode 127 and between the transparent conductive layer 105a and the connecting portion 130. Such a contact deficiency occurs because a surface of the metal surface 125 is oxidized by ashing which is performed before the pixel electrode 105 and the transparent conductive layer 105a are formed or by formation of the pixel electrode 105 and the transparent conductive layer 105a.

As a result, the display quality of a display device including the active matrix substrate 500 is significantly reduced. In addition, a signal voltage needs to be raised in order to compensate for the voltage drop which is caused by an increase in the contact resistance. The rise in the signal voltage increases the power consumption.

SUMMARY OF THE INVENTION

According to one aspect of the invention, an active matrix substrate includes an insulative plate; a plurality of switching elements arranged in a matrix on the insulative plate; a plurality of gate signal lines for controlling the switching elements; a plurality of source signal lines for providing data signals to the switching elements, the source signal lines being perpendicular to the gate signal lines; and a plurality of pixel electrodes respectively provided above and in electric connection with drain electrodes of the switching elements. At least one of the source signal lines and the drain electrodes include at least a transparent conductive layer, a first metal layer and a second metal layer.

In one embodiment of the invention, the transparent conductive layer is formed of ITO.

In one embodiment of the invention, the active matrix substrate further includes connection electrodes connected to drain electrodes for connecting the drain electrodes and the pixel electrodes.

In one embodiment of the invention, the active matrix substrate further includes source signal line terminals, gate signal line terminals, storage capacitance common lines, and storage capacitance common line terminals. At least one of the gate signal line terminals and the storage capacitance common line terminals include at least the transparent conductive layer, the first metal layer and the second metal layer.

In one embodiment of the invention, the transparent conductive layer, the first metal layer and the second metal layer are provided in this order from bottom to top, and the second metal layer is formed of a metal nitride.

In one embodiment of the invention, the first metal layer is formed of tantalum, and the second metal layer is formed of tantalum nitride.

In one embodiment of the invention, the gate signal lines include a third metal layer and a fourth metal layer.

In one embodiment of the invention, the active matrix substrate further include storage capacitance common lines. At least one of the gate signal lines and the storage capacitance common lines include a third metal layer and a fourth metal layer.

In one embodiment of the invention, the third metal layer and the fourth metal layer are provided in this order from bottom to top, and the fourth metal layer is formed of a metal nitride.

In one embodiment of the invention, the third metal layer and the fourth metal layer are provided in this order from bottom to top, and the fourth metal layer is formed of a metal nitride.

In one embodiment of the invention, the active matrix substrate further include gate signal line terminals. The gate signal line terminals include the third metal layer and the fourth metal layer.

In one embodiment of the invention, the active matrix substrate further include gate signal line terminals and storage capacitance common terminals. At least one of the gate signal line terminals and the storage capacitance common line terminals include the third metal layer and the fourth metal layer.

According to another aspect of the invention, an active matrix substrate includes an insulative plate; a plurality of switching elements arranged in a matrix on the insulative plate; a plurality of gate signal lines for controlling the switching elements; a plurality of source signal lines for providing data signals to the switching elements, the source signal lines being perpendicular to the gate signal lines; an interlayer insulative layer, having a contact hole provided therethrough, for covering the switching elements, the gate signal lines and the source signal lines; and a plurality of pixel electrodes provided on the interlayer insulative layer and electrically connected to drain electrodes of the switching elements through the contact hole. At least one of the source signal lines and the drain electrodes include at least a transparent conductive layer, a first metal layer and a second metal layer.

Thus, the invention described herein makes possible the advantage of providing an active matrix substrate which is produced using a reduced number of photolithography steps and provides a satisfactory contact between a pixel electrode and a connecting electrode and between a transparent conductive layer and a connecting portion of each of a gate signal line terminal and a storage capacitance common line terminal.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
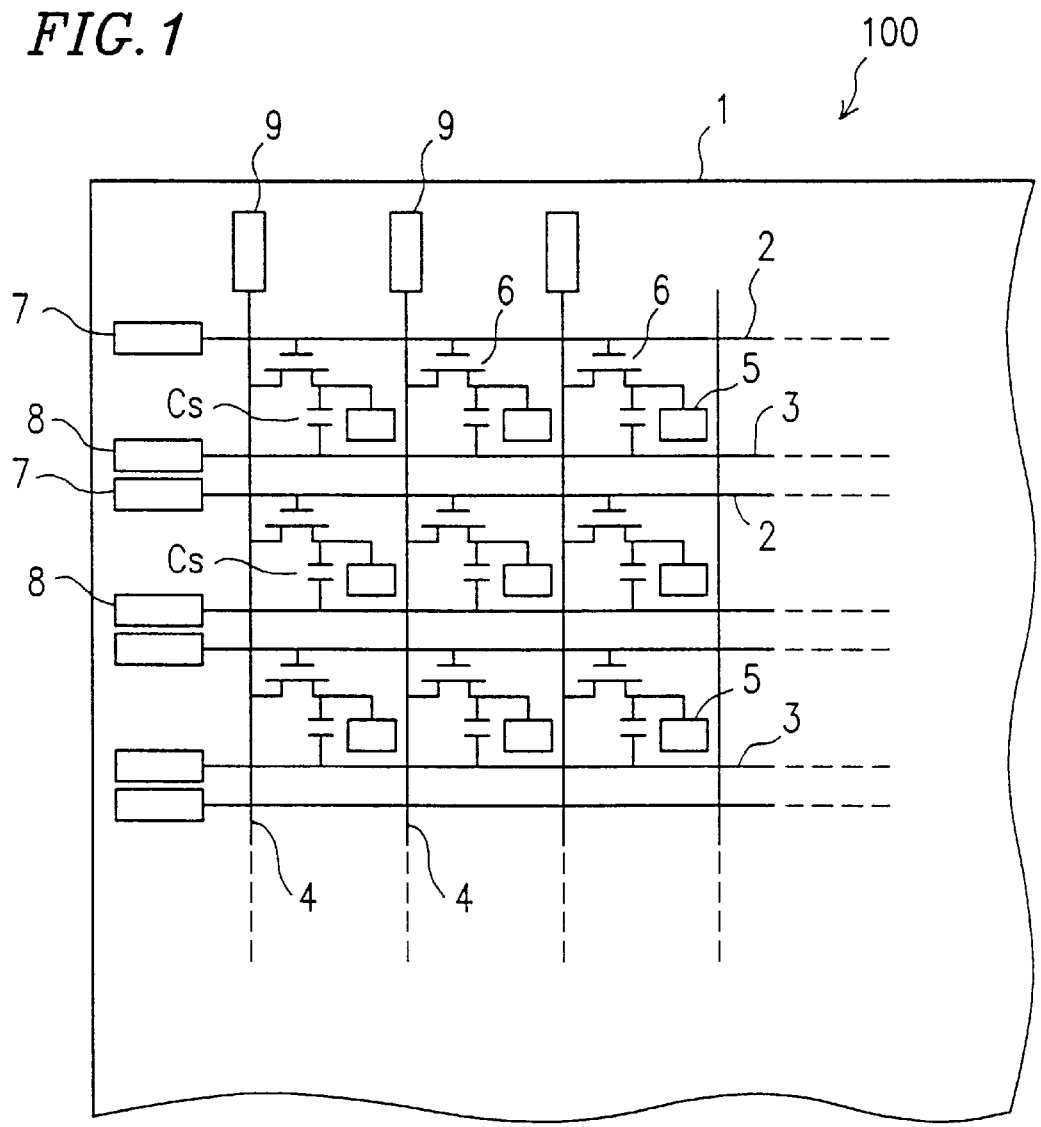
FIG. 1 is an equivalent circuit diagram of an active matrix substrate in a first example according to the present invention.

FIG. 1 is an equivalent circuit diagram of an active matrix substrate 100 in a first example according to the present invention.

The active matrix substrate 100 includes a transparent insulative plate 1 formed of glass or the like, a plurality of gate signal lines 2, a plurality of storage capacitance common lines 3 for forming a storage capacitance Cs, and a plurality of source signal lines 4. The gate signal lines 2, the storage capacitance common lines 3 and the source signal lines 4 are provided on the transparent insulative plate 1. The source signal lines 4 are arranged perpendicular to the gate signal lines 2 and the storage capacitance common lines 3. The active matrix substrate further includes a plurality of pixel electrodes 5 arranged in a matrix and a plurality of TFTs 6 acting as switching elements. The pixel electrodes 5 are connected to the gate signal lines 2 and the source signal lines 4 through the TFTs 6. In the case where the active matrix substrate 100 is included in a transmissive device, the pixel electrodes 5 are formed of a transparent conductive material such as, for example, ITO. In the case where the active matrix substrate 100 is included in a reflective device, the pixel electrodes 5 are formed of aluminum or the like.

The active matrix substrate 100 further includes, in a peripheral area thereof, gate signal line terminals 7 for inputting synchronization signals, storage capacitance common line terminals 8, and source signal line terminals 9 for inputting video signals.

Figure 2:
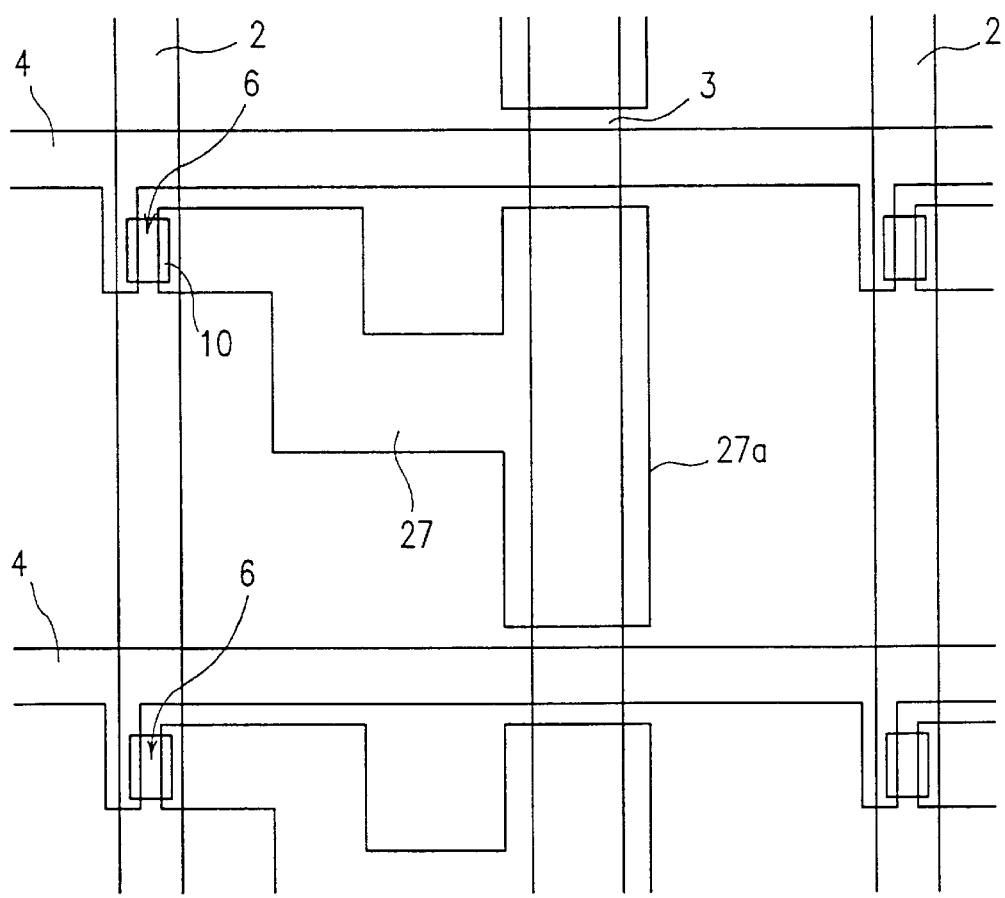
FIG. 2 is a plan view of one pixel area of the active matrix substrate shown in FIG. 1, from which an interlayer insulative layer and a pixel electrode are omitted.
Figure 3:
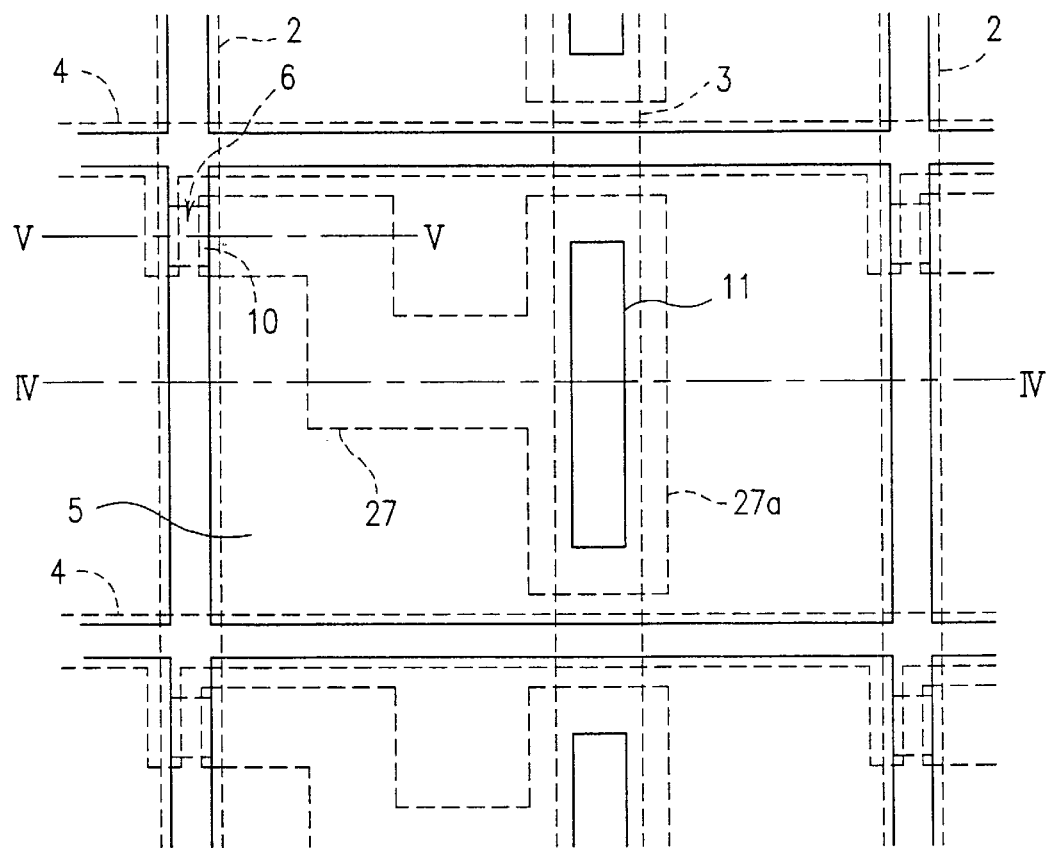
FIG. 3 is a plan view of one pixel area of the active matrix substrate shown in FIG. 1.
Figure 4:
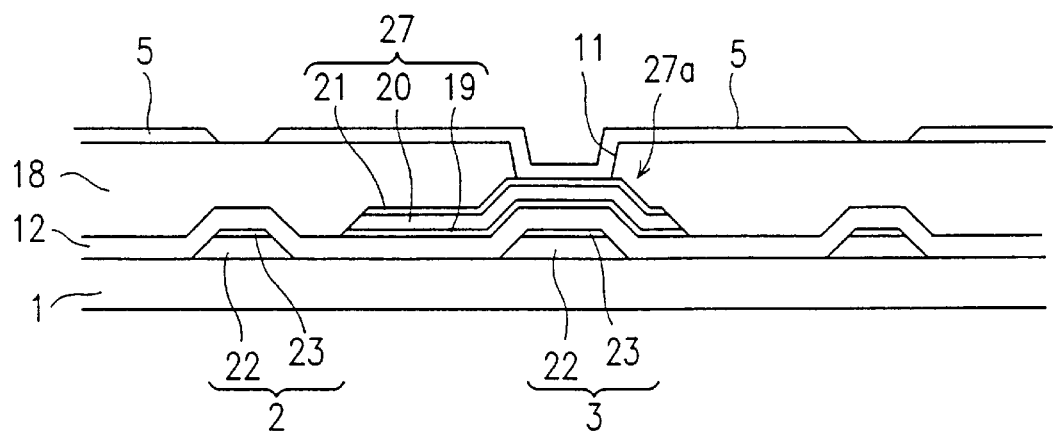
FIG. 4 is a vertical cross-sectional view of the one pixel area shown in FIG. 3 taken along line IV—IV in FIG. 3.
Figure 5:
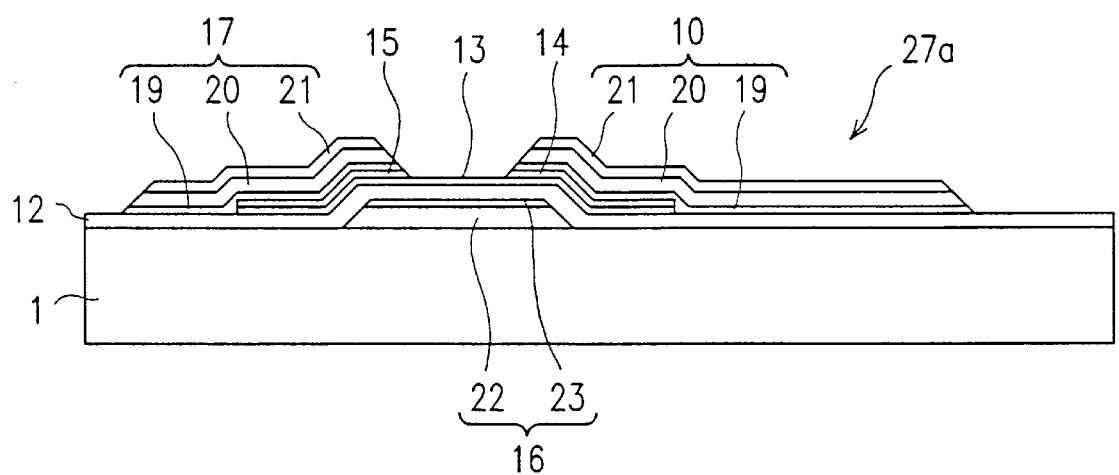
FIG. 5 is a cross-sectional view of a part of the one pixel area shown in FIG. 3 taken along line V—V in FIG. 3.

FIG. 2 is a plan view of one pixel area of the active matrix substrate 100 shown in FIG. 1, from which an interlayer insulative layer and the pixel electrode 5 are omitted. FIG. 3 is a plan view of one pixel area of the active matrix substrate 100. FIG. 4 is a cross-sectional view of the one pixel area shown in FIG. 3 taken along line IV—IV in FIG. 3. FIG. 5 is a cross-sectional view of a part of the one pixel area shown in FIG. 3 taken along line V—V in FIG. 3. As shown in FIG. 3, a peripheral area of the pixel electrode 5 overlaps the gate signal lines 2 and the source signal lines 4. In FIG. 5, an interlayer insulative layer and the pixel electrode 5 are omitted for clarity. The following description will be provided regarding one pixel area for simplicity.

As shown in FIGS. 4 and 5, the gate signal line 2 including a gate electrode 16 and a storage capacitance common line 3 are provided on the transparent insulative plate 1. A gate insulating layer 12 is provided on the transparent insulative plate 1 so as to cover the gate signal line 2 including the gate electrode 16 and the storage capacitance common line 3.

As shown in FIG. 5, a semiconductor layer 13 is provided on the gate insulating layer 12 so as to overlap the gate electrode 16. An n⁺ silicon layer 14 and an n⁺ silicon layer 15 are provided on the semiconductor layer 13 with a gap interposed therebetween. A source electrode 17 and a drain electrode 10 are provided on the n⁺ silicon layers 15 and 14, respectively. The TFT 6 includes the gate electrode 16, the semiconductor layer 13, the n⁺ silicon layers 14 and 15, the source electrode 17 and the drain electrode 10. The gap between the n⁺ silicon layers 14 and 15 corresponds to a channel region of the TFT 6.

As best shown in FIG. 3, the material forming the drain electrode 10 is extended in a direction perpendicular to the gate signal line 2 and the storage capacitance common line 3 and then further extended in a direction overlapping the storage capacitance common line 3. The extended part acts as a connecting electrode 27. The part of the connecting electrode 27 which overlaps the storage capacitance common line 3 acts as a storage capacitor electrode 27a.

As shown in FIG. 4, the interlayer insulative layer 18 is provided on the gate insulative layer 12 so as to cover the elements provided on the gate insulative layer 12. The pixel electrode 5 is provided on the interlayer insulative layer 18. The interlayer insulative layer 18 has a contact hole 11 provided therethrough. The connecting electrode 27 is electrically connected to the pixel electrode 5 through the contact hole 11. The drain electrode 10 (FIG. 5) is electrically connected to the pixel electrode 5 through the connecting electrode 27. A portion where the storage capacitor electrode 27a, the gate insulative layer 12 and the storage capacitance common line 3 overlap one another acts as a storage capacitor.

In the above-described structure, the pixel electrode 5 overlaps the source signal line 4 due to the interlayer insulative layer 18 provided therebetween. Accordingly, the aperture ratio is raised, and the leak between the source signal line 4 and the pixel electrode 5 is reduced.

As best shown in FIG. 5, the source electrode 17 included in the source signal line 4 (not shown), the drain electrode 10, and the connecting electrode 27 extended from the drain electrode 10 include at least an ITO layer 19, a first metal layer 20 formed of tantalum, and a second metal layer 21 formed of tantalum nitride. Although not shown in FIG. 5, a connecting portion (represented by reference numeral 30 in FIG. 7D) of each of the gate signal line terminal 7 and the storage capacitance common line terminal 8 also includes at least an ITO layer 19, a first metal layer 20 formed of tantalum, and a second metal layer 21 formed of tantalum nitride as described below. The second metal layer 21 is provided in order to prevent oxidation of the first metal layer 20. A surface of the first metal layer 20 is oxidized by, for example, ashing or formation of the pixel electrode 5. Ashing is performed before the pixel electrode 5 is formed in order to prevent the interlayer insulative layer 18 from partially remaining in the contact hole 11. The ITO layer 19, the first metal layer 20 and the second metal layer 21, which have a substantially identical planar pattern, are formed by one-step photolithography. Since the number of production steps is reduced, the production process is shortened. Moreover, the possibility of defective photo-patterning is decreased. As a result, the source-drain leak is reduced, which enhances the production yield and reduces the production cost.

Since the oxidation of the first metal layer 20 is prevented, satisfactory contact is obtained between the pixel electrode 5 and the connecting electrode 27 and between a transparent conductive layer (represented by reference numeral 5a in FIG. 7E) and the connecting portion 30. Thus, display quality of a display device including the active matrix substrate 100 is improved, and an increase in the power consumption due to the increase in the contact resistance is avoided.

Another tantalum nitride layer can be provided between the ITO layer 19 and the first metal layer 20 in order to reduce the resistance.

As shown in FIGS. 4 and 5, the gate signal line 2 including the gate electrode 16 and the storage capacitance common line 3 each include a third metal layer 22 formed of a tantalum and a fourth metal layer 23 formed of tantalum nitride. The fourth metal layer 23 is provided for preventing a surface of the third layer 22 from being oxidized. Thus, the contact deficiency is avoided between the gate signal line 2 and the ITO layer 19 in the gate signal line terminal 7 and between the storage capacitance common line 3 and the ITO layer 19 in the storage capacitance common line terminal 8.

The tantalum nitride used for the second metal layer 21 and the fourth metal layer 23 preferably has a nitrogen concentration of as high as 40% or more in order to provide a sufficient anti-oxidation function.

A method for producing the active matrix substrate 100 will be described with reference to FIGS. 6A through 6E and 7A through 7E.

FIGS. 6A through 6E are cross-sectional views illustrating a process for producing the TFT 6. FIGS. 7A through 7E are cross-sectional views illustrating a process for producing the gate signal line terminal 7 and the storage capacitance common line terminal 8. Since the terminals 7 and 8 have a substantially identical structure, the gate signal line terminal 7 will be described as an example.

Figure 6A:
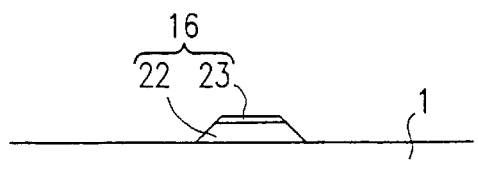
FIGS. 6A through 6E are cross-sectional views illustrating a process for producing a thin film transistor of the active matrix substrate shown in FIG. 1.
Figure 7A:
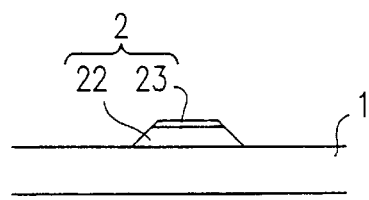
FIGS. 7A through 7E are cross-sectional views illustrating a process for producing a gate signal line terminal and a storage capacitance common line terminal of the active matrix substrate shown in FIG. 1.

First, as shown in FIGS. 6A and 7A, the third metal layer 22 of tantalum and the fourth metal layer 23 of tantalum nitride are sequentially formed in this order on the transparent insulative plate 1 and patterned into the gate signal line 2 including the gate electrode 16. The third metal layer 22 is formed to have a thickness of, for example, about 30 nm, and the fourth metal layer 23 is formed to have a thickness of, for example, about 100 nm. As described above, the tantalum nitride used for the fourth metal layer 23 preferably has a nitride concentration of as high as 40% or more.

Figure 6B:
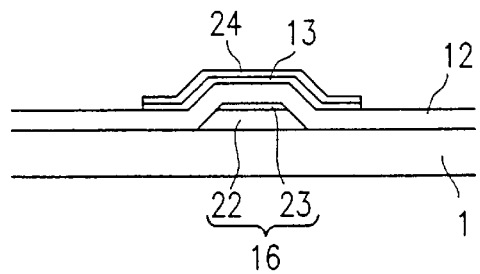
Figure 7B:
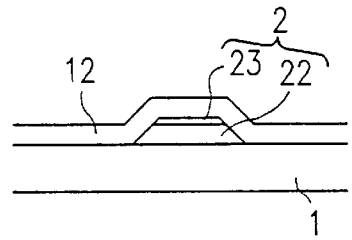

As shown in FIGS. 6B and 7B, the gate insulative layer 12 is formed on the transparent insulative plate 1 to a thickness of, for example, about 300 nm so as to cover the gate electrode 16. As shown in FIG. 6B, the semiconductor layer 13 of amorphous silicon is formed on the gate insulative layer 12 to a thickness of, for example, about 50 nm. Then, an n⁺ silicon layer 24 is formed of μc (microcrystal) n⁺ silicon on the semiconductor layer 13 to a thickness of, for example, about 50 nm.

Figure 7C:
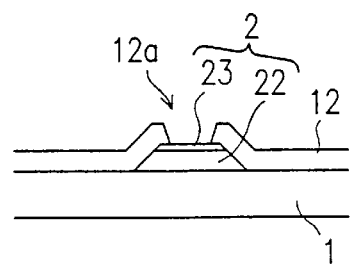

As shown in FIG. 7C, a contact hole 12a for forming the connecting portion 30 (FIG. 7D) of the gate signal line terminal 7 is formed in the gate insulative layer 12.

Figure 6C:
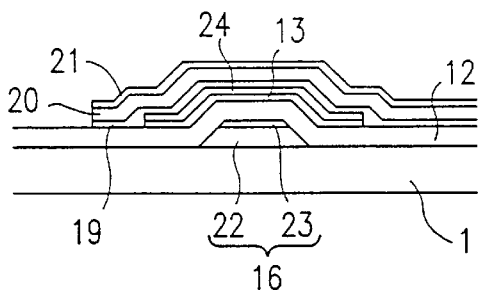

As shown in FIG. 6C, the ITO layer 19 (exemplary thickness: e.g., about 150 nm), the first metal layer 20 (exemplary thickness: e.g., about 150 nm), and the second metal layer 21 (exemplary thickness: e.g., about 30 nm) are formed on the n⁺ silicon layer 24. The n⁺ silicon layer 24 preferably has a thickness in the range of 20 to 200 nm.

The tantalum nitride used for the second metal layer 21 preferably has a nitride concentration of as high as 40% or more.

Figure 6D:
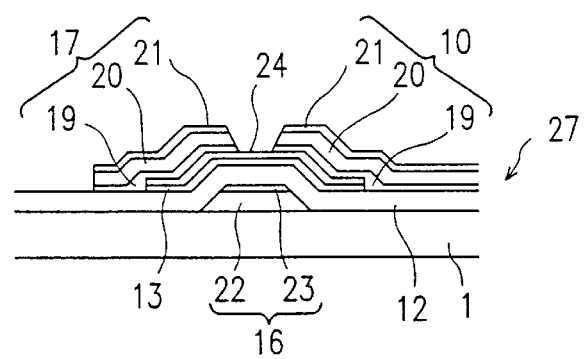
Figure 7D:
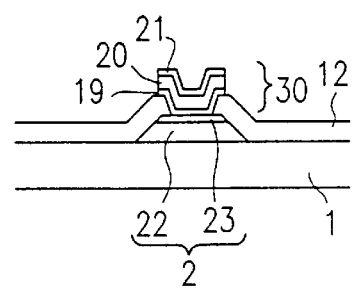

Then, the layers 19, 20 and 21 are patterned. As a result, the source electrode 17 and the drain electrode 10 are formed as shown in FIG. 6D, and the connecting portion 30 is also formed as shown in FIG. 7D. As best shown in FIG. 5, the ITO layer 19, the first metal layer 20 and the second metal layer 21 are patterned to extend on the gate insulative layer 12 from the drain electrode 10 in a direction perpendicular to the gate signal line 2 (FIG. 3) and then in a direction overlapping the storage capacitance common line 3 so as to act as the connecting electrode 27.

Figure 6E:
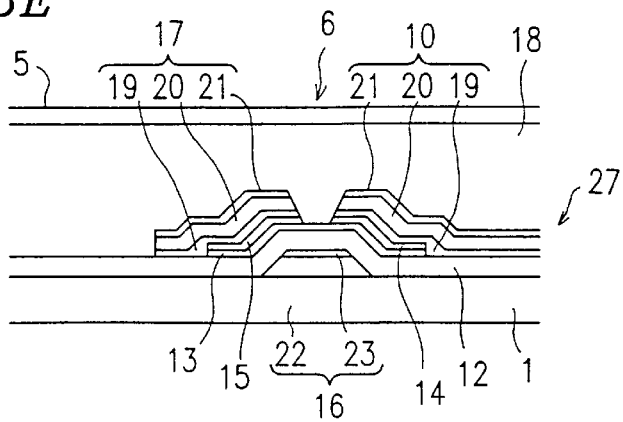
Figure 7E:
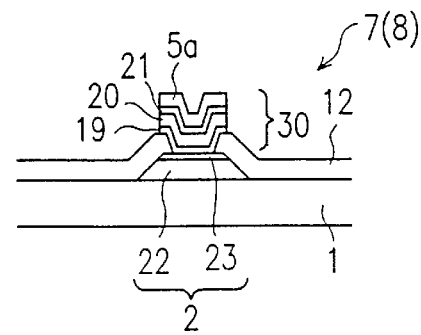

As shown in FIG. 6E, an area of the n+ silicon layer 24 corresponding to a channel region in the semiconductor layer 13 is removed, thereby forming the n+ silicon layers 14 and 15. The interlayer insulative layer 18 is formed of a highly transparent photosensitive resin, for example, an acrylic resin to a thickness of, for example, 2 μm, and a contact hole 11 (not shown in FIG. 6E) is formed in the interlayer insulative layer 18. Ashing is performed in order to prevent the interlayer insulative layer 18 from partially remaining in the contact hole 11. Then, a transparent conductive material layer, for example, an ITO layer is formed on the interlayer insulative layer 18 to a thickness of, for example, about 150 nm and patterned, thereby forming the pixel electrode 5 (FIG. 6E) and the transparent conductive layer 5a (FIG. 7E).

In order to form the source electrode 17 and the drain electrode 10, the n+ silicon layer 24 is treated by dry etching. In the above-described method, ashing is performed after the dry etching, but ashing performed in this step can be eliminated. In an alternative example, after the dry etching, the layers can be treated by plasma which does not use oxidizing gas, for example, nitrogen plasma, helium plasma or argon plasma. In such a case, a surface of the first metal layer 21 is further prevented from being oxidized.

After the formation of the pixel electrode 5, an alignment layer is formed when necessary. Thus, the active matrix substrate 100 is produced. A liquid crystal display device is produced by combining the active matrix substrate 100 with a counter substrate (not shown) and injecting a liquid crystal material into the gap between the two substrates and sealing the gap.

In the above-described example, the gate electrode 16 includes the third metal layer 22 and the fourth metal layer 23. The gate electrode 16 can include only the third metal layer 22.

Figure 8:
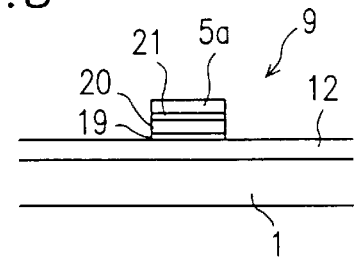
FIG. 8 is a cross-sectional view of a source signal line terminal of the active matrix substrate shown in FIG. 1.
Figure 9:
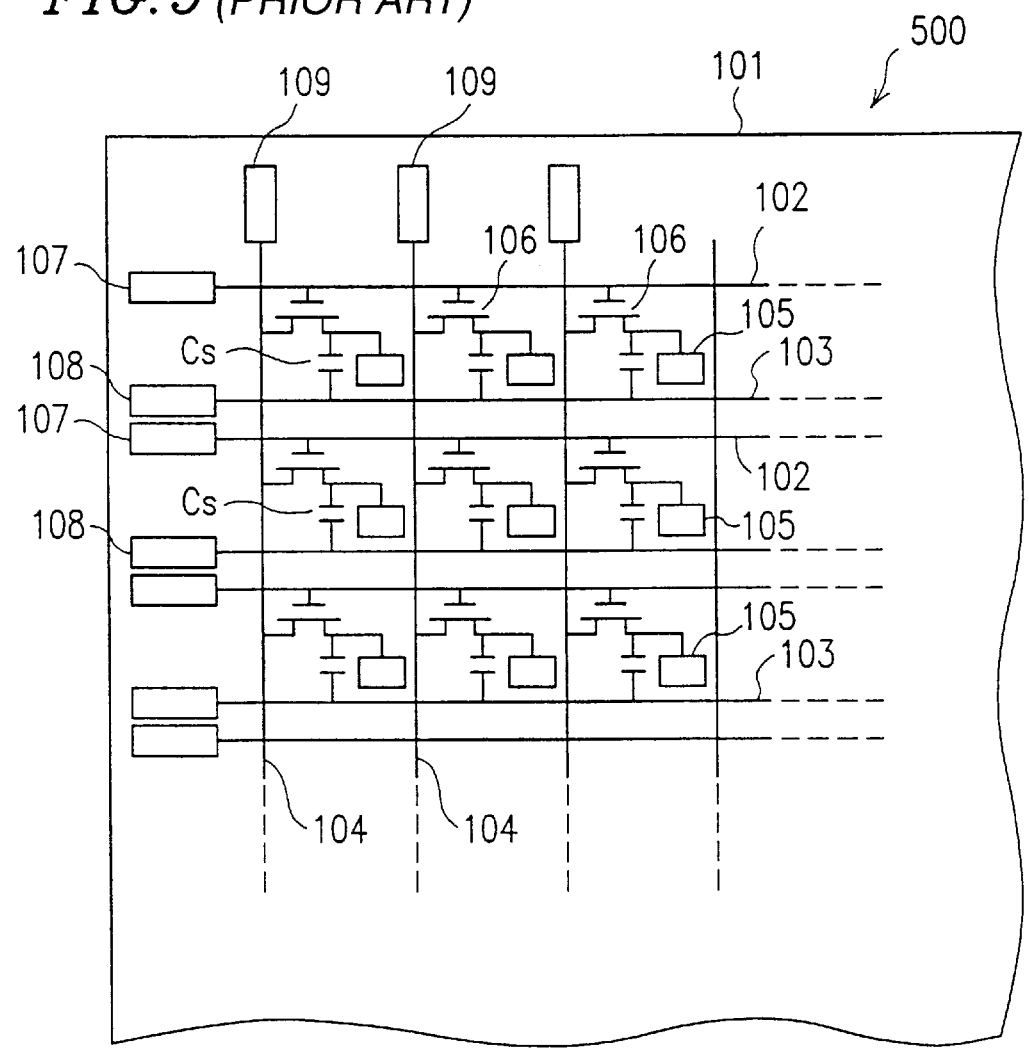
FIG. 9 is an equivalent circuit diagram of a conventional active matrix substrate.
Figure 10:
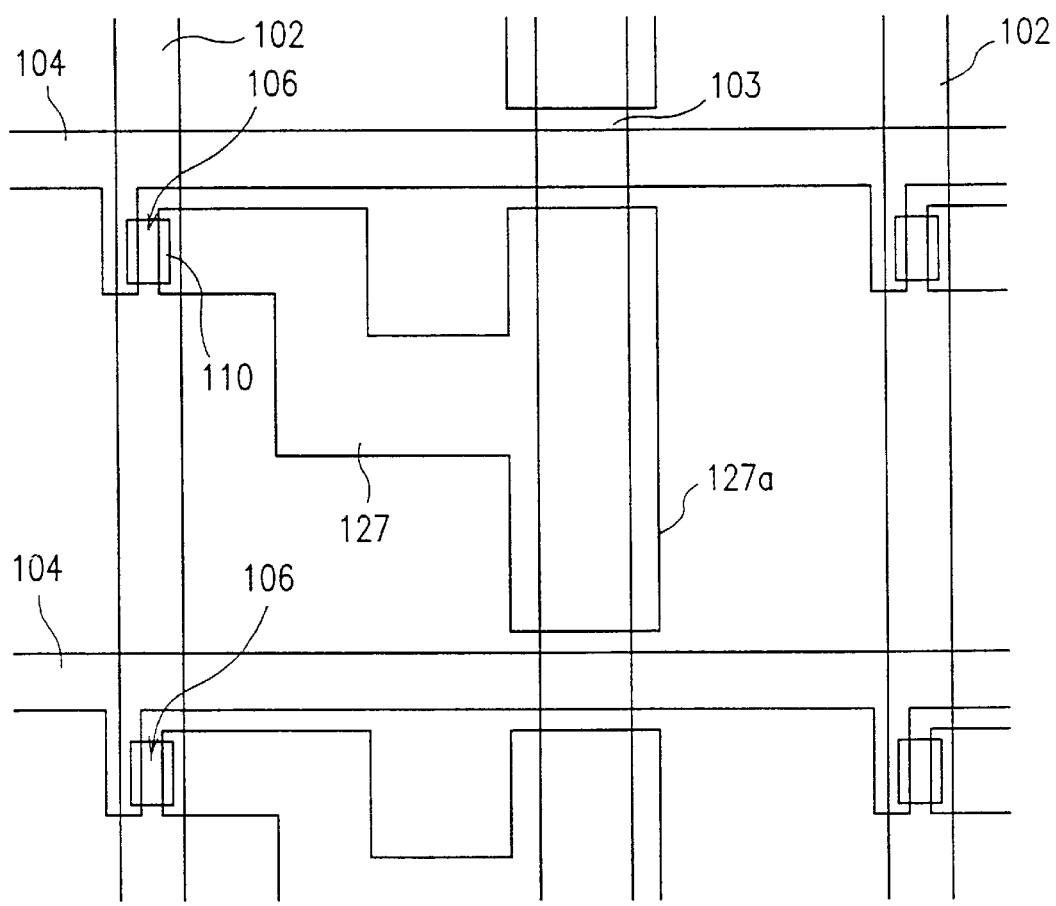
FIG. 10 is a plan view of one pixel area of the active matrix substrate shown in FIG. 9, from which an interlayer insulative layer and a pixel electrode are omitted.
Figure 11:
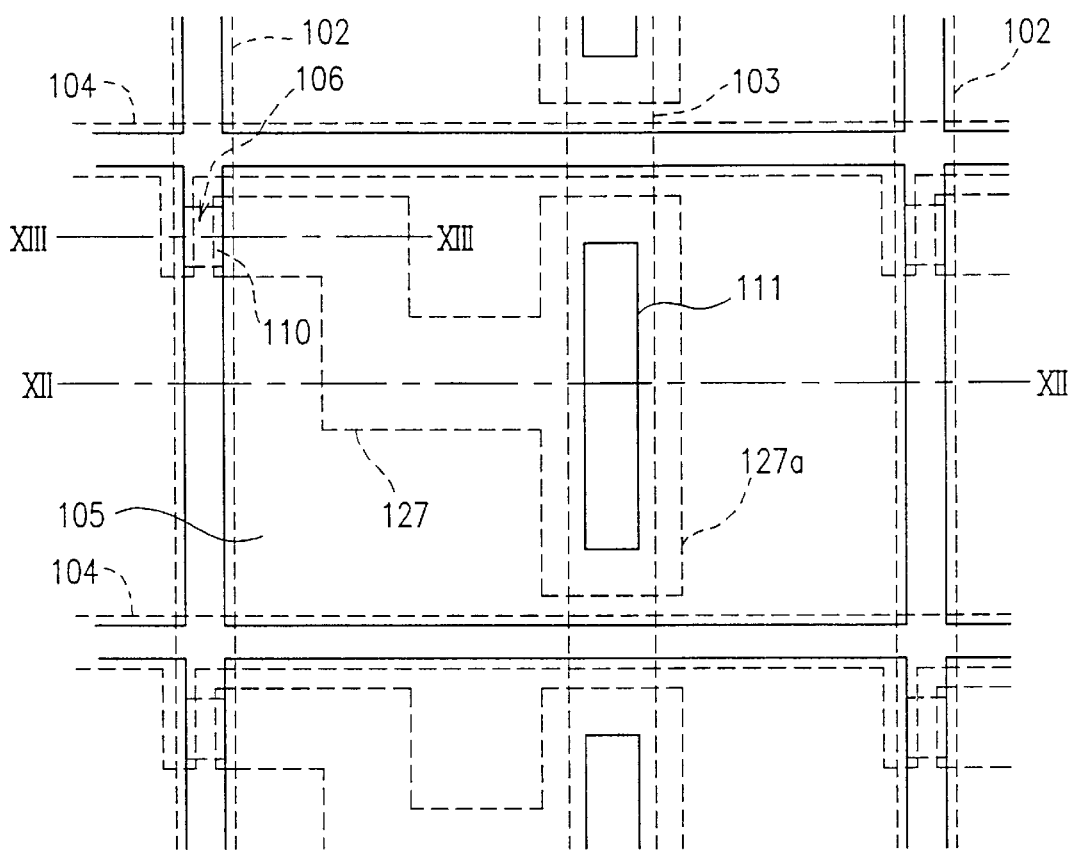
FIG. 11 is a plan view of one pixel area of the active matrix substrate shown in FIG. 9.
Figure 12:
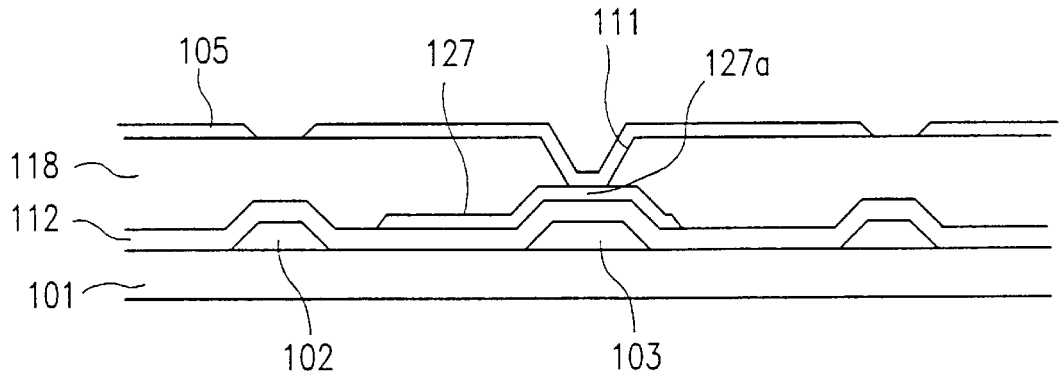
FIG. 12 is a cross-sectional view of a part of the one pixel area shown in FIG. 11 taken along line XII—XII in FIG. 11.
Figure 13:
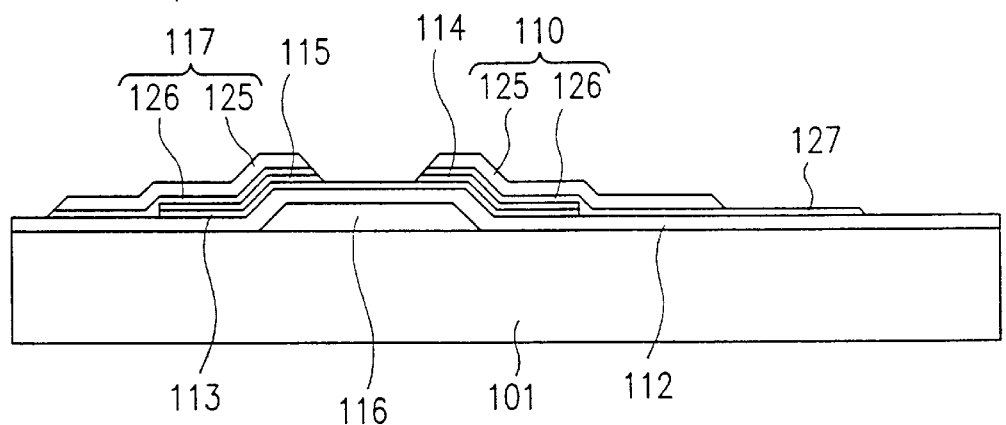
FIG. 13 is a cross-sectional view of a part of the one pixel area shown in FIG. 11 taken along line XIII—XIII in FIG. 11.
Figure 14A:
FIGS. 14A through 14E are cross-sectional views illustrating a process for producing a thin film transistor of the conventional active matrix substrate shown in FIG. 9.
Figure 14B:
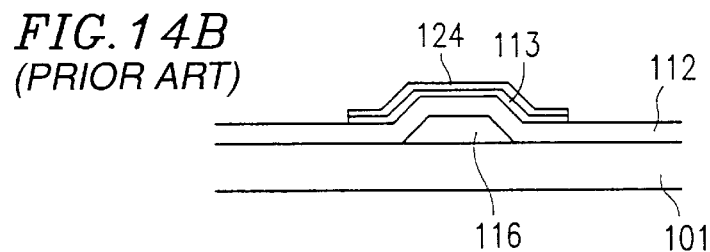
Figure 14C:
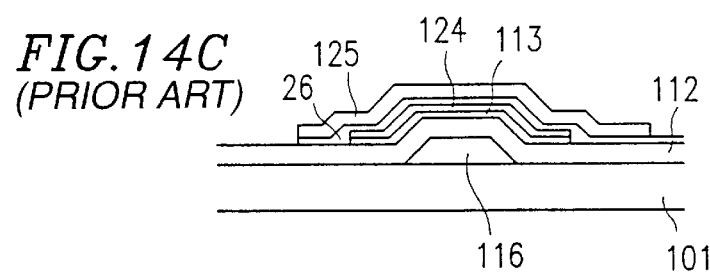
Figure 14D:
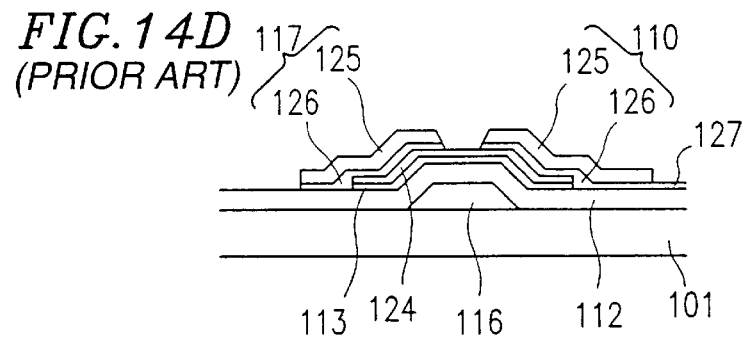
Figure 14E:
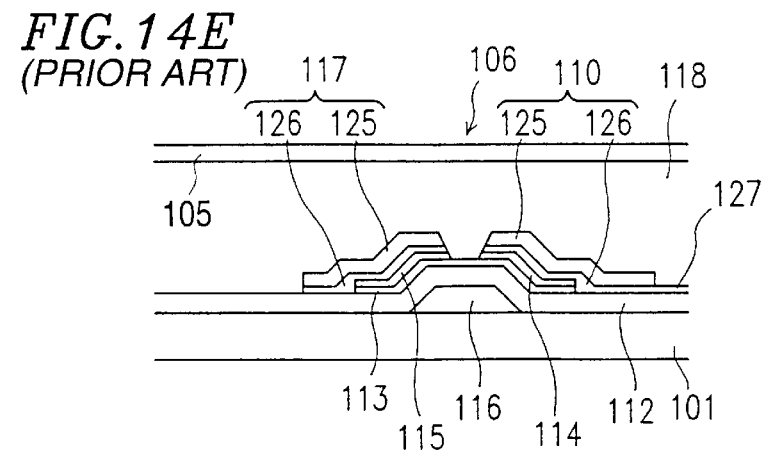
Figure 15A:
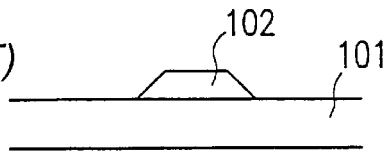
FIGS. 15A through 15E are cross-sectional views illustrating a process for producing a gate signal line terminal and a storage capacitance common line terminal of the conventional active matrix substrate shown in FIG. 9.
Figure 15B:
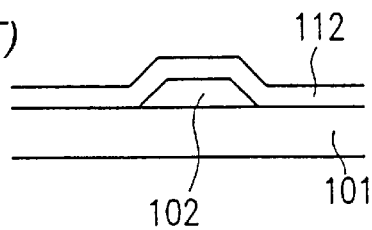
Figure 15C:
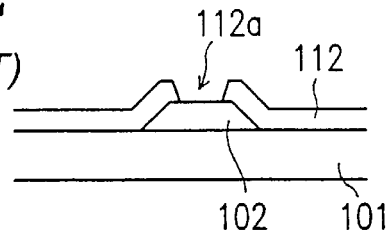
Figure 15D:
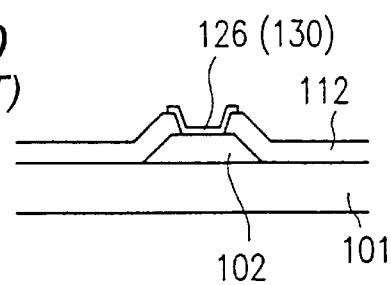
Figure 15E:
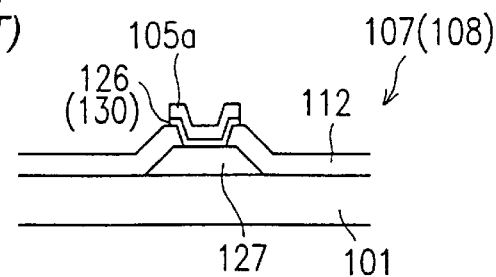

The source signal line terminal 9 includes the ITO layer 19, the first metal layer 20, the second metal layer 21, and the transparent conductive layer 5a as shown in FIG. 8.

In the above-described example, the "Cs on Com" system is adopted, in which the storage capacitance Cs is formed by a storage capacitance common line and the storage capacitor electrode. The present invention is applicable to the "Cs on Gate" system, in which a storage capacitor is formed of the storage capacitor electrode which is connected to one pixel electrode and a gate line adjacent to the gate line to which the one pixel electrode is connected.

In the above example, tantalum is used as the metal material. Alternatively, titanium, molybdenum, niobium, or chrome, for example, are usable in lieu of tantalum.

In the above example, the source signal lines 4 and the drain electrodes 10 include at least the ITO layer 19, the first metal layer 20 and the second metal layer 21. The three-layer structure can be adopted for either the source signal lines 4 or the drain electrodes 10.

In the above example, the connecting portions 30 of the gate signal line terminal 7 and the storage capacitance common line terminal 8 include at least the ITO layer 19, the first metal layer 20 and the second metal layer 21. The three-layer structure can be adopted in the connecting portion 30 of either terminal 7 or 8.

In the above example, the gate signal lines 2 and the storage capacitance common lines 3 include a third metal layer 22 and a fourth metal layer 23. The two-layer structure can be adopted in either the gate signal lines 2 or the storage capacitance common lines 3.

According to the present invention, the source signal lines, the drain electrodes and the connecting electrode include at least three layers; i.e., a transparent conductive layer, a first metal layer and a second metal layer. The connecting portion of each of the gate signal line terminal and the storage capacitance common terminal also includes the transparent conductive layer, the first metal layer and the second metal layer. Due to such a structure, the patterns for these elements are formed in one step of photolithography. Since this shortens the production time and decreases the possibility of the defective photo-patterning, the production yield is raised and the production cost is reduced.

Since the second metal formed of an anti-oxidation material such as, for example, a metal nitride having a high nitrogen concentration is provided on the first metal layer, the contact between the pixel electrode and the connecting electrode and between the transparent conductive layer and a connecting portion of each of the terminals is enhanced. Thus, the display quality of a display device including the active matrix substrate according to the present invention is improved.

Since the gate signal lines and the storage capacitance common lines include a fourth metal layer formed of, for example, a metal nitride having a high nitrogen concentration as described above in addition to a third metal layer, the gate signal lines and the storage capacitance common lines have a satisfactory contact with the ITO layer formed thereon in the gate signal line terminals and the storage capacitance common line terminals.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate, comprising:
   an insulative plate;
   a plurality of switching elements arranged in a matrix on the insulative plate;
   a plurality of gate signal lines for controlling the switching elements;
   a plurality of source signal lines for providing data signals to the switching elements, the source signal lines being perpendicular to the gate signal lines; and
   a plurality of pixel electrodes respectively provided above and in electric connection with drain electrodes of the switching elements,
   wherein at least one of the source signal lines and the drain electrodes include at least a transparent conductive layer, a first metal layer and a second metal layer,
   wherein the uppermost layer of the three layers is a metal nitride layer.

2. An active matrix substrate, comprising:
   an insulative plate;
   a plurality of switching elements arranged in a matrix on the insulative plate;

a plurality of gate line signals for controlling the switching elements;

a plurality of source signal lines for providing data signals to the switching elements, the source signal lines being perpendicular to the gate signal lines;

an interlayer insulative layer, having contact holes provided therethrough, for covering the switching elements, the gate signal lines and the source signal lines; and a plurality of pixel electrodes provided on the interlayer insulative layer and electrically connected to drain electrodes of the switching elements through the contact holes, wherein the drain electrodes extend beneath the contact holes, wherein at least one of the source signal lines and the drain electrodes include at least a transparent conductive layer, a first metal layer and a second metal layer and wherein the uppermost layer of the three layers is a metal nitride layer.

3. An active matrix substrate according to claim 1, wherein the transparent conductive layer is formed of ITO.

4. An active matrix substrate according to claim 1, further comprising connection electrodes connected to drain electrodes for connecting the drain electrodes and the pixel electrodes.

5. An active matrix substrate according to claim 1, further comprising source signal line terminals, gate signal line terminals, storage capacitance common lines, and storage capacitance common line terminals, wherein at least one of the gate signal line terminals and the storage capacitance common line terminals include at least the transparent conductive layer, the first metal layer and the second metal layer.

6. An active matrix substrate according to claim 3, wherein the transparent conductive layer, the first metal layer and the second metal layer are provided in this order from bottom to top, and the second metal layer is formed of a metal nitride.

7. An active matrix substrate according to claim 6, wherein the first metal layer is formed of tantalum, and the second metal layer is formed of tantalum nitride.

8. An active matrix substrate according to claim 1, wherein the gate signal lines include a third metal layer and a fourth metal layer.

9. An active matrix substrate according to claim 1, further comprising storage capacitance common lines, wherein at least one of the gate signal lines and the storage capacitance common lines include a third metal layer and a fourth metal layer.

10. An active matrix substrate according to claim 8, wherein the third metal layer and the fourth metal layer are provided in this order from bottom to top, and the fourth metal layer is formed of a metal nitride.

11. An active matrix substrate according to claim 9, wherein the third metal layer and the fourth metal layer are provided in this order from bottom to top, and the fourth metal layer is formed of a metal nitride.

12. An active matrix substrate according to claim 10, further comprising gate signal line terminals, wherein the gate signal line terminals include the third metal layer and the fourth metal layer.

13. An active matrix substrate according to claim 11, further comprising gate signal line terminals and storage capacitance common terminals, wherein at least one of the gate signal line terminals and the storage capacitance common line terminals include the third metal layer and the fourth metal layer.

14. An active matrix substrate, comprising:

an insulative plate;

a plurality of switching elements arranged in a matrix on the insulative plate;

a plurality of gate signal lines for controlling the switching elements;

a plurality of source signal lines for providing data signals to the switching elements, the source signal lines being perpendicular to the gate signal lines; and a plurality of pixel electrodes respectively provided above and in electrical connection with drain electrodes of the switching elements, wherein a metal nitride layer is provided as the uppermost layer of at least one of the source signal lines and the drain electrodes.

15. An active matrix substrate according to claim 14, wherein the metal nitride layer has a nitrogen concentration of 40% or more.

16. An active matrix substrate according to claim 14, wherein both of the source signal lines and drain electrodes include at least a transparent conductive layer, a first metal layer and a second metal layer.

17. An active matrix substrate according to claim 1, wherein the metal nitride layer has a nitrogen concentration of 40% or more.

18. An active matrix substrate according to claim 2, wherein the metal nitride layer has a nitrogen concentration of 40% or more.

19. An active matrix substrate according to claim 1, wherein both of the source signal lines and drain electrodes include at least a transparent conductive layer, a first metal layer and a second metal layer.

20. An active matrix substrate according to claim 2, wherein both of the source signal lines and drain electrodes include at least a transparent conductive layer, a first metal layer and a second metal layer.

21. An active matrix substrate according to claim 8, wherein the fourth metal layer is a metal nitride having a nitrogen concentration of 40% or more.

22. An active matrix substrate according to claim 9, wherein the fourth metal layer is a metal nitride having a nitrogen concentration of 40% or more.

23. An active matrix substrate according to claim 2, further comprising:

storage capacitance common lines, wherein the portions of said drain electrodes extending beneath the contact holes overlap said storage capacitance common lines with an insulator therebetween to form storage capacitors.

* * * * *